US011201696B2

(12) United States Patent
Schoppmeier et al.

(10) Patent No.: US 11,201,696 B2
(45) Date of Patent: Dec. 14, 2021

(54) METHOD AND DEVICE FOR RETRANSMISSION

(71) Applicant: Lantiq Beteiligungs-GmbH & Co. KG, Neubiberg (DE)

(72) Inventors: Dietmar Schoppmeier, Unterhaching (DE); Gert Schedelbeck, Munich (DE); Bernd Heise, Munich (DE)

(73) Assignee: Lantiq Beteiligungs-GmbH & Co. KG, Neubiberg (DE)

(*) Notice: Subject to any disclaimer, the term of this patent is extended or adjusted under 35 U.S.C. 154(b) by 25 days.

(21) Appl. No.: 16/827,927

(22) Filed: Mar. 24, 2020

(65) Prior Publication Data

US 2020/0228242 A1 Jul. 16, 2020

Related U.S. Application Data

(60) Continuation of application No. 16/050,750, filed on Jul. 31, 2018, now Pat. No. 10,680,757, which is a
(Continued)

(51) Int. Cl.
*H04L 1/08* (2006.01)
*H04L 1/18* (2006.01)
(Continued)

(52) U.S. Cl.
CPC .............. *H04L 1/08* (2013.01); *H04L 1/1607* (2013.01); *H04L 1/188* (2013.01); *H04L 1/248* (2013.01); *H04L 1/0083* (2013.01)

(58) Field of Classification Search
CPC ......... H04L 1/08; H04L 1/188; H04L 1/1607; H04L 1/248; H04L 1/0083
See application file for complete search history.

(56) References Cited

U.S. PATENT DOCUMENTS

| 5,502,733 A | 3/1996 | Kishi et al. |
| 7,158,473 B2 | 1/2007 | Kurobe et al. |

(Continued)

FOREIGN PATENT DOCUMENTS

| EP | 1450521 A2 | 8/2004 |
| EP | 1944900 A1 | 7/2008 |
| WO | 2005112331 A2 | 11/2005 |

OTHER PUBLICATIONS

Qualcomm Europe: "Principles for the new CELL_PCH/URA_PCH operation." 3GPP Draft: R2-071200, 3RD Generation Partnership Project (3GPP). Mobile Competence Centre; 650, Route Des Lucioles; F-06921 Sophia-Antipolis Cedex; France, vol. RAN WG2, No. St. Julian; Mar. 22, 2007, Mar. 22, 2007 (Mar. 22, 2007).
(Continued)

*Primary Examiner* — Kyle Vallecillo
(74) *Attorney, Agent, or Firm* — 2SPL Patent Attorneys PartG mbB; Yong Beom Hwang

(57) ABSTRACT

Embodiments related to retransmission in a communication system are described and depicted. In one embodiment, a retransmission entity repeats a transmission of a data transfer unit by the device after a predetermined number of other transmitted data transfer units has been transmitted. The retransmission entity may also determine whether a measure for a time period since the first transmission of the data transfer unit by the device has exceeded a predetermined threshold and to provide a final transmission of the data transfer unit based on the determining that the measure for the time period has exceeded the predetermined threshold.

25 Claims, 11 Drawing Sheets

Related U.S. Application Data continuation of application No. 15/463,789, filed on Mar. 20, 2017, now Pat. No. 10,084,572, which is a continuation of application No. 14/332,380, filed on Jul. 15, 2014, now Pat. No. 9,602,247, which is a division of application No. 12/885,203, filed on Sep. 17, 2010, now Pat. No. 8,782,483.

(60) Provisional application No. 61/243,190, filed on Sep. 17, 2009, provisional application No. 61/243,191, filed on Sep. 17, 2009.

(51) Int. Cl.
    *H04L 1/16*     (2006.01)
    *H04L 1/24*     (2006.01)
    *H04L 1/00*     (2006.01)

(56) References Cited

U.S. PATENT DOCUMENTS

| | | | |
|---|---|---|---|
| 7,773,498 B2 | 8/2010 | Kurobe et al. | |
| 8,036,244 B2 | 10/2011 | Naoe et al. | |
| 2002/0069388 A1 | 6/2002 | Niu et al. | |
| 2002/0080792 A1 | 6/2002 | Rosier | |
| 2004/0213184 A1 | 10/2004 | Hu et al. | |
| 2005/0025153 A1* | 2/2005 | Bremer | H04L 12/56 370/395.1 |
| 2007/0019718 A1 | 1/2007 | Heise | |
| 2007/0280107 A1 | 12/2007 | Ludwig et al. | |
| 2008/0062872 A1* | 3/2008 | Christiaens | H04L 1/1835 370/231 |
| 2008/0063007 A1* | 3/2008 | Christiaens | H04L 1/1614 370/458 |
| 2009/0086759 A1 | 4/2009 | Heise et al. | |
| 2009/0089638 A1 | 4/2009 | Heise et al. | |
| 2009/0138775 A1* | 5/2009 | Christiaens | G06F 1/12 714/748 |
| 2009/0154356 A1 | 6/2009 | Wiemann et al. | |
| 2009/0154535 A1* | 6/2009 | Tsao | H04M 11/062 375/220 |
| 2009/0177938 A1* | 7/2009 | Pons | H04L 1/1867 714/751 |
| 2010/0070817 A1* | 3/2010 | Heise | H04L 1/188 714/749 |

OTHER PUBLICATIONS

Non-Final Office Action dated Jan. 4, 2013 for U.S. Appl. No. 12/885,203.
Notice of Allowance dated May 30, 2013 for U.S. Appl. No. 12/885,203.
Notice of Allowance dated Feb. 20, 2014 for U.S. Appl. No. 12/885,203.
European Search Report for EP10009834 dated Apr. 5, 2011.
Notice of Allowance dated Nov. 18, 2016 for U.S. Appl. No. 14/332,380.
Final Office Action dated Dec. 2, 2015 for U.S. Appl. No. 14/332,380.
Non-Final Office Action dated May 21, 2015 for U.S. Appl. No. 14/332,380.
Notice of Allowance dated May 30, 2018 for U.S. Appl. No. 15/463,789.
Final Office Action dated Jan. 26, 2018 for U.S. Appl. No. 15/463,789.
Non-Final Office Action dated Jul. 27, 2017 for U.S. Appl. No. 15/463,789.
Non-Final Office Action dated Aug. 5, 2019 for U.S. Appl. No. 16/050,750.
Final Office Action dated Nov. 20, 2019 for U.S. Appl. No. 16/050,750.
Notice of Allowance dated Feb. 6, 2020 for U.S. Appl. No. 16/050,750.

* cited by examiner

Handling with Reporting in 2 modes

RTX Receiver DMT symbols

| DMT data symbol | DMT data symbol | DMT data symbol | DMT data symbol | DMT data symbol | DMT data symbol | DMT data symbol | DMT data symbol | DMT sync symbol | DMT data symbol | DMT data symbol | DMT data symbol | DMT data symbol |
|---|---|---|---|---|---|---|---|---|---|---|---|---|
| DTU #2 | DTU #3 | DTU #4 | DTU #5 | DTU #6 | DTU #7 | DTU #8 | DTU #9 | DTU #10 | DTU #11 | DTU #12 | DTU #13 | DTU #14 | DTU #15 | DTU #16 | DTU #17 | no received DTUs | DTU #18 | DTU #19 | DTU #20 | DTU #21 | DTU #22 | DTU #23 | DTU #24 | DTU #25 | last received DTU #3 last received DTU #9

RTX Receiver Absolute DTU Count of received DTUs

RRC Transmitter DMT symbols

| DMT data symbol | DMT data symbol | DMT sync symbol | DMT data symbol | DMT data symbol | DMT data symbol | DMT data symbol | DMT data symbol | DMT data symbol | DMT data symbol | DMT data symbol | DMT data symbol | DMT data symbol |
|---|---|---|---|---|---|---|---|---|---|---|---|---|
| ACK/NACK of DTU #2 & #3 | ACK/NACK of DTU #4 & #5 | no RRC codeword | ACK/NACK of DTU #6 & #7 | ACK/NACK of DTU #8 & #9 | ACK/NACK of DTU #10 & #11 | ACK/NACK of DTU #12 & #13 | ACK/NACK of DTU #14 & #15 | ACK/NACK of DTU #16 & #17 | ACK/NACK of DTU #18 & #19 | ACK/NACK of DTU #20 & #21 | ACK/NACK of DTU #22 & #23 |

RRC Codeword direct DTU ACK/NACK reporting

FIG. 6b

METHOD AND DEVICE FOR RETRANSMISSION

REFERENCE TO RELATED APPLICATIONS

This application is a continuation of U.S. application Ser. No. 16/050,750 filed on Jul. 31, 2018, which is a continuation of U.S. application Ser. No. 15/463,789 filed on Mar. 20, 2017, which is a continuation of U.S. application Ser. No. 14/332,380 filed on Jul. 15, 2014, now U.S. Pat. No. 9,602,247, which is a divisional of U.S. application Ser. No. 12/885,203 filed on Sep. 17, 2010, now U.S. Pat. No. 8,782,483, which claims priority to U.S. Provisional Application 61/243,190 filed on Sep. 17, 2009 and U.S. Provisional Application 61/243,191 filed on Sep. 17, 2009, and is hereby incorporated by reference herein.

BACKGROUND

Modern data communication systems such as DSL communication systems transmit a plurality of different data types. Data of high-quality services such as IPTV services or video services require an efficient noise protection since missing data often provide strong disturbances of these services. Present impulse noise protection with Reed Solomon coding and interleaving provide not sufficient protection for these high-quality services.

Retransmission schemes have been introduced to address noise protection for high-quality services as well as other services. In retransmission, data transmitted over a communication link such as a subscriber line is stored at the transmitter site for some time. In case the receiver site receives corrupt data, for example when an impulse noise occurs, the transmitter site retransmits the data based on a request from the receiver again over the communication link. In order to provide high security for the transmission, an implemented retransmission scheme should be reliable and secure for situations occurring during the operation of the system.

SUMMARY

According to an embodiment, a method includes repeating a transmission of a previously transmitted data transfer unit by a device after a predetermined number of other data transfer units has been transmitted by the device. A determining is made whether a measure for a time period since the first transmission of the data transfer unit by the device has exceeded a predetermined threshold. A final transmission of the previously transmitted data transfer unit is provided based on a determining that the measure for the time period has exceeded the predetermined threshold.

According to an embodiment, a method includes determining a first value indicating a length of repetitive impulse noise events occurring on a communication system when transmitting data from a first device to a second device and determining a second value indicating a period length of the repetitive impulse noise events occurring on the communication system. A parameter of a retransmission for the communication system such as a parameter used to generate a retransmission return message is configured based on the first and second value.

According to a further embodiment, a method includes a determining for a data transfer unit in a retransmission queue of a device whether a measure for a time period since the first transmission of the data transfer unit by the device exceeds a predetermined limit. If it is determined for the data transfer unit that the measure for a time period since the first transmission exceeds a predetermined limit, a final transmission of the data transfer unit is provided.

According to a further embodiment, a method of operating a communication system includes transferring a plurality of information related to a retransmission return message from a second device to a first device and providing by the second device in a first mode for at least one first information of the plurality of information a predefined value. The second device provides in a further mode for the at least one first information a value which is derived from at least one data transfer unit received by the second device from the first device.

BRIEF DESCRIPTION OF THE SEVERAL VIEWS OF THE DRAWINGS

FIG. 6*a* and FIG. 6*b* show exemplary receive and transmit sequences.

DETAILED DESCRIPTION

Figure 1:
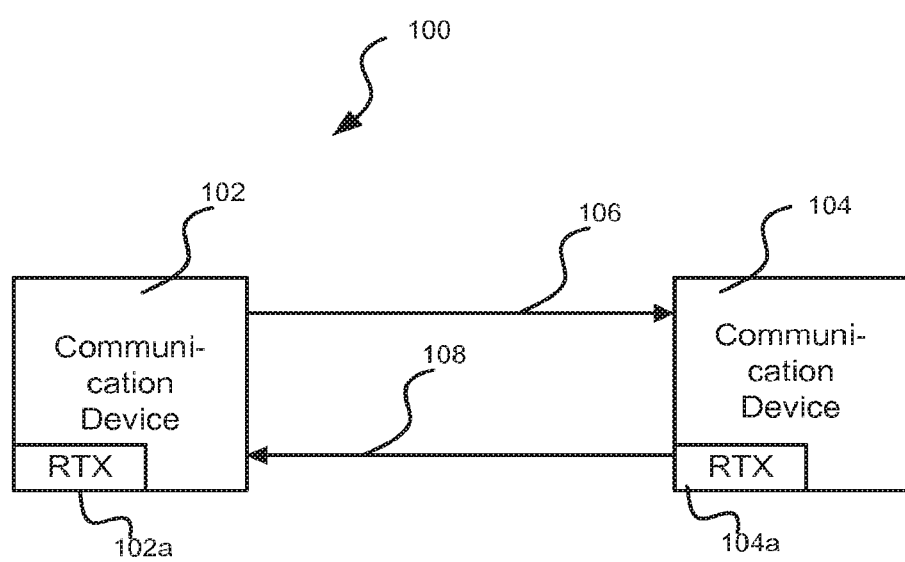
FIG. 1 shows a block diagram according to an embodiment.

The following detailed description explains exemplary embodiments of the present invention. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number.

The embodiments described below with respect to the figures are directed to provide a new concept for retransmission and configuration of retransmission in communication systems. FIG. 1 shows an embodiment of a communication system 100 having a communication device 102 and a communication device 104. The communication system 100 may for example be a DSL system, in which the first and second devices are connected via a twisted pair copper line. The communication system 100 establishes a first communication channel 106 from the device 102 to the device 104 and a second communication channel 108 from the device 104 to the device 102. The concept of communication channels is known to a person skilled in the art. In DSL for example, the first and second communication channel can be established on a single twisted pair copper line by using subcarriers of different frequency bands provided for a DMT (discrete multitone) modulation.

The device 102 has a first retransmission entity 102a which is configured to provide retransmission functionality for data send via the communication channel 106 to the second device 104. The device 104 has a second retransmission entity 104a which for example provides a checking of correct receiving of received data and generating of retransmission return messages. Retransmission is a concept to provide protection of data against noise occurring on the communication channel. Data transmitted over the communication channel 106 are stored in a retransmission buffer at the first device 102 and are therefore eligible for retransmission in case noise occurred on the line during the transmission of the data. Thus, by using retransmission, loss of data can be avoided when the second device 104 receives data corrupted due to noise during the transmission. Corruption of the data during the transmission may either result from a single event such as a Single High Impulse Noise Event (SHINE) or from repetitive noise such as Repetitive Electrical Impulse Noise (REIN) which is coupled in from nearby electrical AC-Power transmission or AC-power sources. For example, for DSL communication systems, Single High Impulse Noise Event and Repetitive Electrical Impulse Noise are one of the major noise sources. Depending on the frequency used for transmitting DC power, Repetitive Electrical Impulse Noise is for example occurring at a frequency of 100 Hz or at a frequency of 120 Hz.

A Single High Impulse Noise Event arises typically as a non-periodic stream of impulses with long duration time, high impulse power and random occurrence times. Such impulses may have a length up to multiple milliseconds.

In the described embodiment of FIG. 1, only data transmitted over the first communication channel 106 are protected by retransmission. In other words, only data transmitted in the direction from the first device 102 to the second device 104 are eligible for retransmission while data transmitted in the opposite direction from the second device 104 to the first device 102 are not protected by retransmission. However, in other embodiments, the communication system 100 may provide for retransmission in both directions.

For providing retransmission, data are framed prior to the transmission in basic units which are hereinafter referred to as data transfer units (DTU). The data transfer units may in some embodiments have a container-like structure in which integer multiples of higher layer data unit types such as ATM cells or predefined fractions of Ethernet frames (such as 64/64 B encapsulation portions) are included in a single data transfer unit. The data transfer unit may be framed such that an integer multiple of a FEC (Forward Error Correction) code word fits into one data transfer unit. In other words, the data transfer unit is synchronized to integer multiple FEC code words. The FEC code word which may for example be a RS (Reed Solomon) code word may however in embodiments be generated after framing the data transfer unit. The container may also in some embodiments include dummy or padding data which are provided within the data transfer unit and may be configurable. Each data transfer unit may further include a sequence identifier which is a unique identification marking or identifier for each data transfer unit which allows correctly reassembling retransmitted data with other non-retransmitted data, i.e. with data which is included in a correct received data transfer unit and may further include a time stamp which allows a supervision of retransmission excess delay in a correct received data transfer unit.

Figure 2:
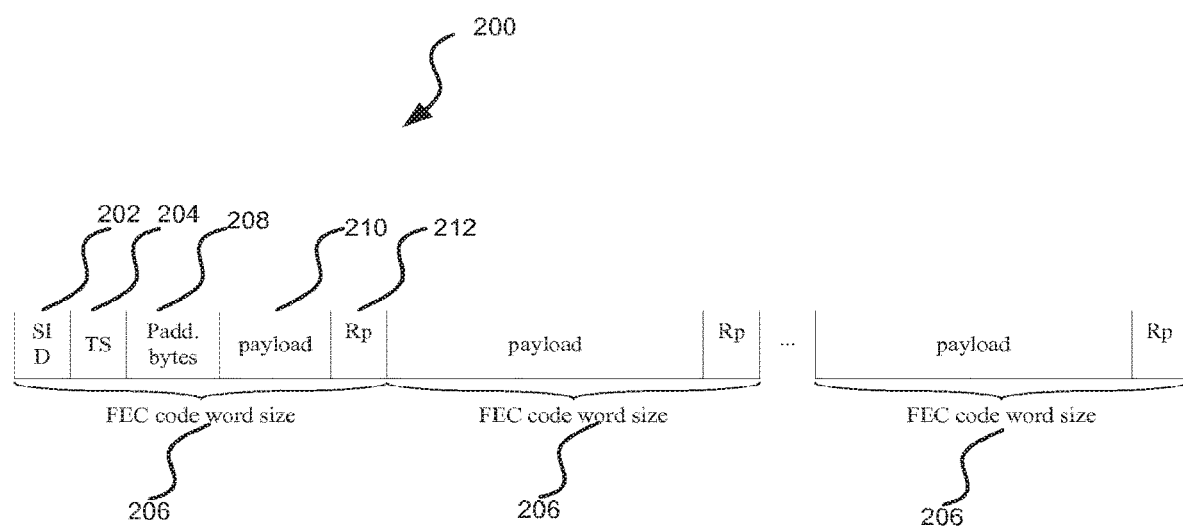
FIG. 2 shows a structure of a data transfer unit according to an embodiment.

FIG. 2 shows one example of a framing structure 200 for data transfer unit which may for example be used in DSL systems such as ADSL (Asymmetric Digital Subscriber Line) or VDSL (Very High Data Rate Digital Subscriber Line).

The data transfer unit 200 comprises the sequence identifier 202 and a time stamp 204 provided in a first field associated with a first one of multiple FEC code words 206 to which the data transfer unit is matched to and synchronized with. The time stamp 204 may for example be provided by including a sequence number derived from a DMT (discrete multitone modulation) symbol counter. The time stamp 204 may indicate an expected or virtual time in which the data transfer unit is expected to be transmitted by the device 102 to the device 104 or to pass a predefined point in the transmission protocol or process flow. However, in other embodiments the time stamp 204 can be provided in many other ways as is known for a person skilled in the art. Payload data 210 obtained from higher protocol layers is provided in the data transfer unit. Payload data may for example include ATM cell data or fractions of Ethernet packets. Redundancy Information 212 for the FEC code words may later be determined when the data of the data transfer unit container is provided to a FEC processing. Padding bytes 208 are provided in the data transfer unit. FIG. 2 shows the padding bytes exemplary associated with the first FEC code word but it is to be understood that the adding of padding bytes is configurable and may be different in other embodiments.

It is to be noted that the data transfer unit 200 described with respect to FIG. 2 is only of exemplary character and that other framing types for a data transfer unit may be provided. For example, according to one embodiment, a check sum of the data transfer unit may be provided in one of the FEC code words.

In order to implement the retransmission, the communication channel 108 provides a retransmission return channel (RRC) in the direction reverse to the retransmission channel 106. The retransmission return channel allows a transmission of a retransmission return message from the device 104 to the device 102. The retransmission return message may in embodiments be provided continuously with each transmitted data communication symbol such as each transmitted DMT symbol. As will be described below in more detail, the retransmission return message may include information such as an acknowledgement information, an identifier information for identifying to which data transfer unit the received retransmission return message refers to and other historic information related to the receiving of data transfer units in the past.

The retransmission functionality such as the retransmission functionality for a DSL communication system is provided in the lowest protocol layer which is also referred to as PHY layer (physical layer). Retransmission functionality in the PHY layer typically has fundamentally differences to retransmission at layers higher than the PHY layer.

Figure 3:
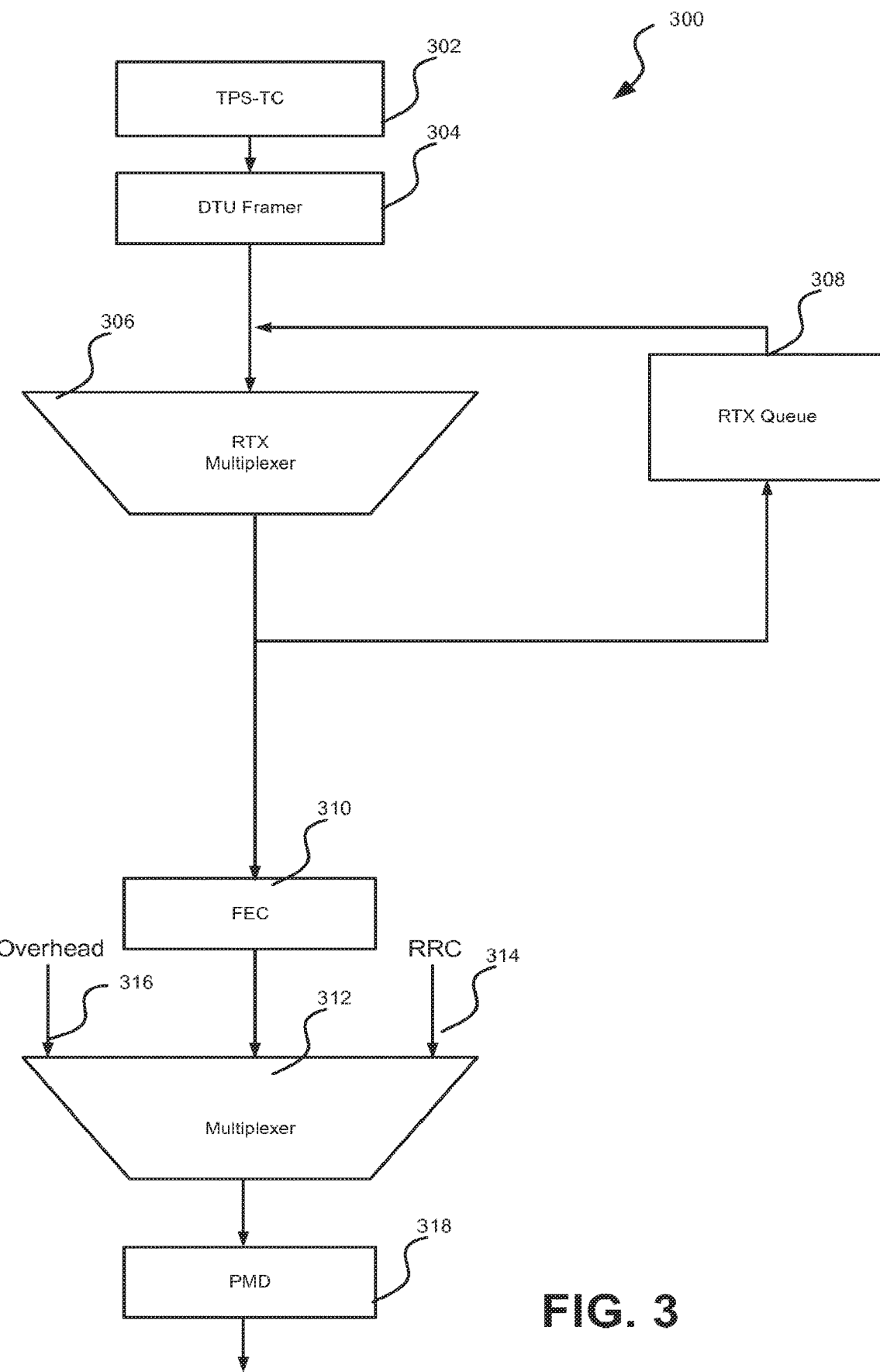
FIG. 3 shows a block diagram according to an embodiment.

FIG. 3 shows a block diagram 300 of an exemplary implementation of the retransmission functionality in a DSL PHY layer for the first device 102. To be more specific, the retransmission is provided in the PMS-TC sub-layer (Physical Media Specific-Transmission Convergence layer) between the TPS-TC sub-layer (Transmission Protocol Specific-Transmission Convergence layer) and the PMD sub-layer (Physical Media Dependent layer). The TPS-TC sub-layer, PMS-TC sub-layer, and PMD sub-layer are sub-layers of the PHY layer known to a person skilled in the art and will therefore not be described in more detail here.

The retransmission functionality receives from a TPS-TC sub-layer 302 data such as ATM cells or 64/65 encapsulation data. The received data is provided to a data transfer unit framer 304 providing framing for the received data.

The data transfer unit framer 304 outputs data transfer unit frames which are provided to a retransmission multiplexer 306. Retransmission multiplexer 306 multiplexes data transfer unit frames from the data transfer unit framer 304 and data transfer unit containers provided from a retransmission queue 308 for retransmission into a common stream. Data transfer unit containers output from the retransmission multiplexer are provided to a FEC encoder 310 and are further copied to the retransmission queue 308 storing the data transfer unit containers for providing later retransmission of same if necessary. It is to be noted that other functional entities such as a scrambler may be provided between the retransmission multiplexer 306 and the FEC encoder 310.

The FEC encoder 310 provides FEC encoding for the received data transfer unit containers and adds the redundancy information to each code word.

The FEC encoder 310 outputs FEC code words to a multiplexer 312 which multiplexes the FEC code words with retransmission return information provided by a RRC stream 314 and Overhead information from an Overhead stream 316 into a common stream. The common stream output from the multiplexer is transferred for further processing to the PMD layer providing DMT modulation and other lower layer functions.

The retransmission return message provides information from the device 104 to the device 102. In one embodiment the retransmission return message includes a first NACK/ACK bit for providing a positive or negative acknowledgement of the last received data transfer unit and a second NACK/ACK bit for providing a positive or negative acknowledgement for the second-to-last received data transfer unit. The acknowledgement field for the last received and second last received data transfer unit is hereinafter referred to as NACK[0] and NACK[1]. A positive acknowledgement is provided when the data transfer unit has been received correct (good). A data transfer unit is received correct when the receiver is capable to correctly reconstruct the data of the received data transfer unit which may also include using the error protection provided in the data transmission symbols.

The retransmission return message further includes in this embodiment the last five least significant bits (Lsbs) of an absolute data transfer unit count number of the last received data transfer unit which is hereinafter referred to as Absolute DTUCountLsbs[4:0]. The Absolute DTUCountLsbs[4:0] provides an identifier information to identify to which transmitted data transfer unit the retransmission return message refers to.

Furthermore, in this embodiment a historic information field ConsecutiveGoodDTUs is provided in the return message. The historic information field indicates a number of consecutive correct received data transfer units. The value for the historic information is an integer value and allows values up to a maximum number max_hist. Max_hist may for example be 31 in one embodiment such that the historic field is in the form of ConsecutiveGoodDTU [4:0]. Based on whether the second-to-last received data transfer unit was correct or corrupt, the historic information is determined in different ways. This will be explained with respect to FIG. 4. As can be seen from FIG. 4, in a decision 402, if the second-to-last data transfer unit was not corrupt, i.e. was received correct, the historic information is determined by counting the consecutive correct data transfer units prior to the second to last data transfer unit. If the second to last data transfer unit is a corrupt data transfer unit, a count start data transfer unit ST_1 is determined to be the data transfer unit which is Ib data transfer units prior to the second-to-last data transfer unit. The parameter Ib which may be also referred to as look back parameter is a configurable integer number. Embodiments for configuring the parameter Ib will be described in the following.

In embodiments, the value for the parameter Ib is configured based on determined REIN properties. To be more specific, the parameter Ib is determined based on a determined duration length of REIN impulses and the determined period of REIN impulses which is the time between the start of two consecutive REIN impulses. In embodiments, INP_min_rein which is a measure of the duration length of a single REIN impulse in units of corrupt DMT symbols due to the single REIN impulse and ia_rein_flag which is a measure for the period of REIN impulses is used.

The value of ia_rein_flag being set to 0 indicates that the REIN frequency is 100 Hz and the duration for a single REIN impulse iat_rein is equal to 1/100 sec=10 msec=10*fs DMT symbols, where fs is the symbol rate in kilo symbols/sec without a unit. The value of iat_rein set to 1 indicates that the REIN frequency is equal to 120 Hz and the REIN impulse duration iat_rein is equal to 1/120 sec=25/3 msec*25/3*fs DMT symbols, where fs is again the symbol rate in kilo symbols/sec without a unit.

In the following embodiments, the value to be configured for Ib is calculated such that the consecutive correct data transfer unit history is not obscured by the second-to-last REIN impulse. This will be explained in more detail with respect to FIG. 5.

Figure 5:
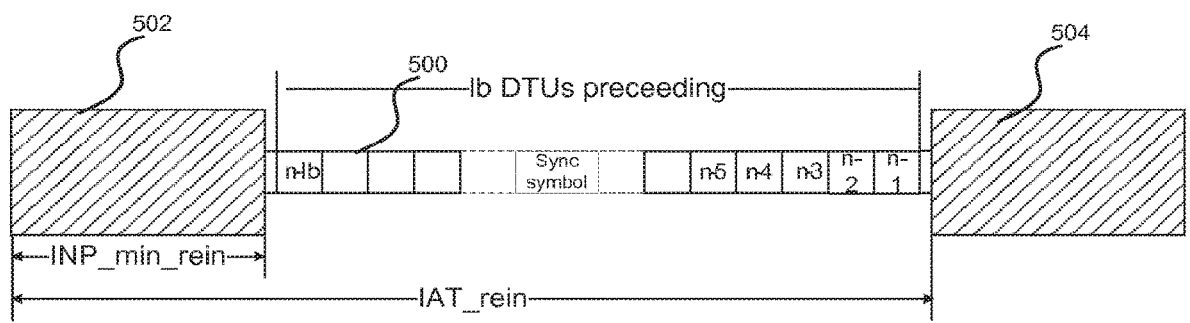
FIG. 5 shows an exemplary data transfer unit receive sequence.

FIG. 5 shows an exemplary data transfer unit receive sequence 500 which is obstructed by two consecutive REIN impulses 502 and 504. FIG. 5 further shows a SYNC symbol 506 transmitted between two consecutive data transfer units of the data transfer unit receive sequence. A SYNC symbol is a predetermined symbol which is transmitted in regular periods for example after 68 transmitted DMT symbols for providing synchronization between the two devices 102 and 104.

Figure 4:
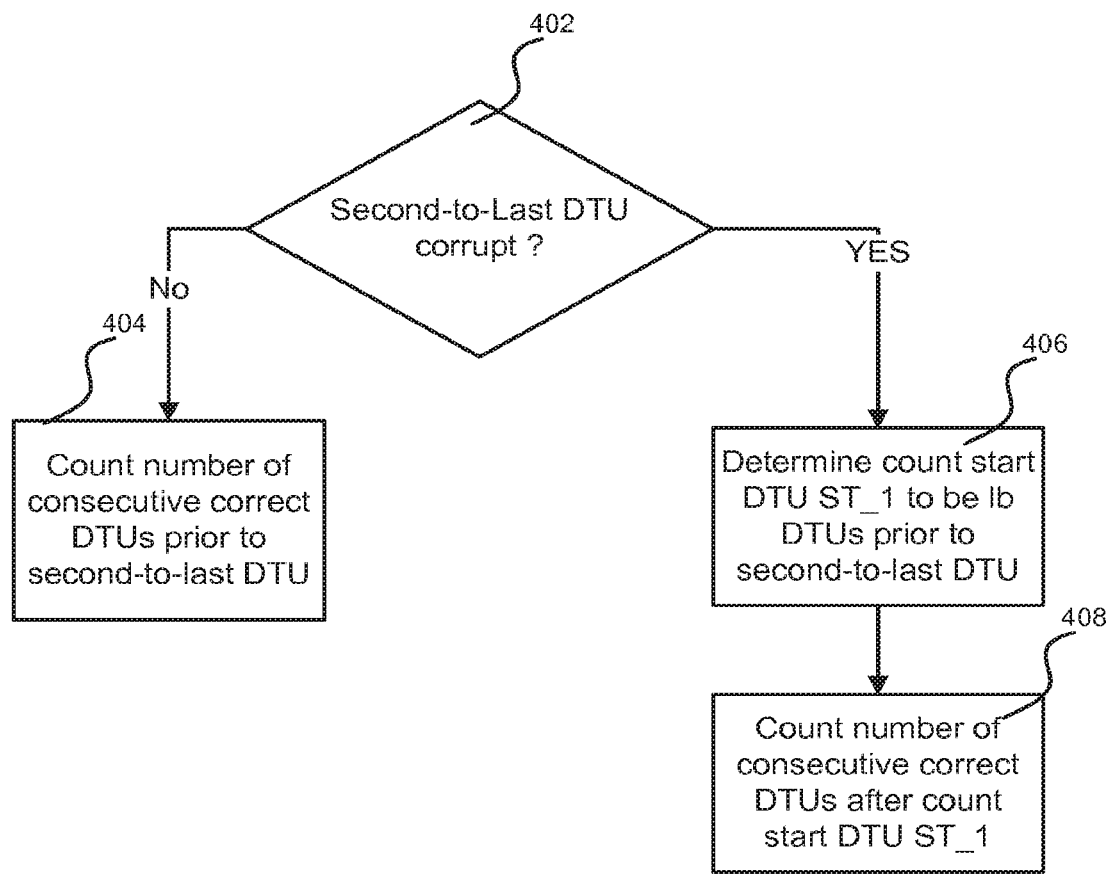
FIG. 4 shows a flow diagram according to an embodiment.

In FIG. 5, the data transfer unit with sequence number n−1 is shown to be the latest data transfer unit of the sequence which is not obscured by the second REIN impulse 504. For the calculation of a configuration value for the Ib parameter, the requirement is established that the count start ST_1 (which is in FIG. 5 the data transfer unit with sequence number n-Ib) for the calculation according to 408 in FIG. 4 is not obscured by the REIN impulse 502.

In mathematical terms, this requirement can expressed by:

$$Ib = \text{floor}((c\_impulse\_periode - c\_impulse\_length - a) / (c\_DTU\_length)) - b).$$

In the above relation, c_impulse_periode is a measure of the period of the repetitive impulse noise such as the INP_min_rein value, c_impulse_length is a measure of the length of the repetitive impulse noise and c_DTU_length is a measure of the length of the data transfer unit. Furthermore, a is an integer number equal to 1 which takes into account that a SYNC symbol may be inserted between the two REIN impulses 502 and 504. In addition, b is an integer number providing a number of data transfer units as a safety measure.

Taking further into account that the historic information ConsecutiveGoodDTUs has a maximum value of hist_max and that the REIN frequency can have 100 Hz (ia_rein_flag=0) or 120 Hz (ia_rein_flag=1), the configuration requirement is obtained by:

$$\text{ia\_rein\_flag=0: } Ib=\min(\text{hist\_max};\text{floor}((10\text{ sec}*fs-\text{INP\_min\_rein}-a)/(S1*Q))-b),$$

$$\text{ia\_rein\_flag=1: } Ib=\min(\text{hist\_max};\text{floor}((25/3\text{ sec}*fs-\text{INP\_min\_rein}-a)/(S1*Q))-b),$$

with S1*Q being the data transfer unit size in DMT symbols, INP_min_rein being the impulse noise duration in DMT symbols and f being the DMT symbol rate.

In the following embodiments, the value to be configured for Ib is calculated such that the consecutive correct data transfer unit history is not obscured by the second-to-last REIN impulse. This will be explained in more detail with respect to FIG. 5.

FIG. 5 shows an exemplary data transfer unit receive sequence 500 which is obstructed by two consecutive REIN impulses 502 and 504. FIG. 5 further shows a SYNC symbol 506 transmitted between two consecutive data transfer units of the data transfer unit receive sequence. A SYNC symbol is a predetermined symbol which is transmitted in regular periods for example after 68 transmitted DMT symbols for providing synchronization between the two devices 102 and 104.

In FIG. 5, the data transfer unit with sequence number n−1 is shown to be the latest data transfer unit of the sequence which is not obscured by the second REIN impulse 504. For the calculation of a configuration value for the Ib parameter, the requirement is established that the count start ST_1 (which is in FIG. 5 the data transfer unit with sequence number n-Ib) for the calculation according to 408 in FIG. 4 is not obscured by the REIN impulse 502.

In mathematical terms, this requirement can expressed by:

$$Ib=\text{floor}((c\_\text{impulse\_periode}-c\_\text{impulse\_length}-a)/(c\_\text{DTU\_length}))-b).$$

In the above relation, c_impulse_periode is a measure of the period of the repetitive impulse noise such as the INP_min_rein value, c_impulse_length is a measure of the length of the repetitive impulse noise and c_DTU_length is a measure of the length of the data transfer unit. Furthermore, a is an integer number equal to 1 which takes into account that a SYNC symbol may be inserted between the two REIN impulses 502 and 504. In addition, b is an integer number providing a number of data transfer units as a safety measure.

Taking further into account that the historic information ConsecutiveGoodDTUs has a maximum value of hist_max and that the REIN frequency can have 100 Hz (ia_rein_flag=0) or 120 Hz (ia_rein_flag=1), the configuration requirement is obtained by:

$$\text{ia\_rein\_flag=0: } Ib=\min(\text{hist\_max};\text{floor}((10\text{ sec}*fs-\text{INP\_min\_rein}-a)/(S1*Q))-b),$$

$$\text{ia\_rein\_flag=1: } Ib=\min(\text{hist\_max};\text{floor}((25/3\text{ sec}*fs-\text{INP\_min\_rein}-a)/(S1*Q))-b),$$

with S1'Q being the data transfer unit size in DMT symbols, INP_min_rein being the impulse noise duration in DMT symbols and f being the DMT symbol rate.

In a further embodiment, the calculation of the Ib parameter may be based on the actual length of the retransmission queue provided in device 102. Assuming that the length of the data transfer unit includes c data transfer units, a data transfer unit that has been transmitted more than c data transfer units before the latest retransmission return message is received is no more available at the retransmission queue of device 102. Therefore, any information in the retransmission return message on data transfer units that is older than c data transfer units is no more useful because the respective data transfer unit can not be retransmitted anyway.

On the other hand, the larger Ib is provided, the higher is the probability that the history information can be obscured by previous impulse noise that is different that the periodic REIN noise. Such situation occur for example in an environment of combined REIN and SHINE noise. In view of this, in one embodiment, the Ib parameter is determined such that same is not greater than c where c is the retransmission queue length at the device 102, i.e. at the retransmission transmitter.

In one embodiment, when a data transfer unit transmitted from device 102 to device 104 is not acknowledged by a retransmission return message send from device 104 to 102, the device 102 cyclic retransmits this non-acknowledged data transfer unit every Qth transmitted data transfer unit, i.e. after Q−1 other data transfer unit have been transmitted after the last transmission of this data transfer unit. The cyclic retransmission will be described later in more detail with respect to FIGS. 8a and 8b. For such retransmission scheme, a reference state machine may be used to determined Qtx which provides best performance.

In other embodiments, the above cyclic transmission is combined with a final transmission. In this embodiment, when the time period since the very first transmission of this data transfer unit exceeds a predetermined limit, the data transfer unit is transmitted once more and is then no longer eligible for retransmission. The cyclic retransmission combined with a final transmission will be later described in more detail with respect to FIGS. 8c and 8d. In such a scheme with final retransmission, the value of Qtx can be chosen much lower and may be determined only based on the maximal roundtrip time (maximal roundtrip delay). The round-trip time is the time it takes to process and transmit the data transfer unit from device 102 to device 104, to receive the data transfer unit at the device 104 and to generate the retransmission return message for this data transfer unit, to transmit the retransmission return message from the device 104 to the device 102 and to receive this retransmission return and process the retransmission return message at the device 102. In one embodiment, the Ib parameter may therefore be provided by:

$$Ib=\min(\text{hist\_max},c),$$

with hist_max and c as described above. The length c of the queue can in one embodiment take thereby the values of:
c=Qtx (in units of DTUs), in case the reference state machine is used, and
c=maximal roundtrip delay+1 (in units of DTUs).

In one embodiment, the calculation of the value for the Ib parameter may be based on the periodic impulse noise parameters (REIN period and REIN length) and also be based on the length c of the retransmission queue. In this embodiment, the value for Ib is obtained by:

$$Ib=\min(\text{hist\_max};c;\text{floor}((c\_\text{impulse\_periode}-c\_\text{impulse\_length}-a)/(c\_\text{DTU\_length}))-b)).$$

Depending in which region the operator is located, the REIN frequencies are either 100 Hz (ia_rein_flag=0) and 120 Hz (ia_rein_flag=1). For these two cases, the above equation results in:

$$\text{ia\_rein\_flag=0: } Ib=\min(\text{hist\_max};c;\text{floor}((10\text{ sec}*fs-\text{INP\_min\_rein}-a)/(S1*Q))-b),$$

$$\text{ia\_rein\_flag=1: } Ib=\min(\text{hist\_max};c;\text{floor}((25/3\text{ sec}*fs-\text{INP\_min\_rein}-a)/(S1*Q))-b).$$

As described above, in embodiments the value of c may be c=Qtx for cases in which only a cyclic retransmission is used and c=maximal roundtrip delay +1 in cases in which a cyclic retransmission combined with a final retransmission is used.

In the above described embodiments, the calculation of the value for the Ib parameter may be provided either by device 102 or 104 and may be transferred between the two devices.

Having now described the configuration of the parameter Ib, in the following the generating of the retransmission return message during a starting of the communication system in user data mode (showtime) will be described.

After the initialization of the communication system is completed, both communication channels 106 and 108 are typically not entering showtime at the same time.

In case the channel 108 enters into showtime later than the channel 106, the device will not receive any meaningful data from the retransmission return channel. In this case, the retransmission transmitter of device 102 will not execute any retransmission until the communication channel 108 has also entered into showtime.

However, in the case the channel 108 enters into showtime prior to the channel 106, since the retransmission return message is provided continuously, the device 104 has to generate the retransmission return message and to transmit this message to device 102. In the following, different cases or modes can be distinguished. The generating of the retransmission return message in all these cases is based on a virtual extension into the past in which it is assumed that a predetermined number N_max_virt of consecutive correct received data transfer units has been received in the past by device 104. N_max_virt may in one embodiment correspond to the maximum value of ConsecutiveGoodDTUs+2. In one embodiment, in which the maximum value of Consecutive-GoodDTUs is 31, N_max_virt is obtained to be 33.

Furthermore, it is assumed in the embodiments that a wrap-around of the absolute data transfer unit counter value occurs at the showtime entry of communication channel 106 i.e. with the first data transfer unit transmitted from device 102 to device 104.

In embodiments, the device 104 will provide in case that no complete data transfer unit has been received from device 102 a retransmission return message which will include only predefined values for the information of the message. In such a mode of generating the retransmission return message based on predefined information, the values provided in the message correspond to a virtual situation in which it is assumed that in the past only correct data transfer units have been received. The values in this case provided for the return message are then:
Nack[1:0]=00 which indicates that the last two "virtual" received data transfer units have been correctly received;
AbsoluteDTUCountLsbs[4:0]=11111 which indicates that the absolute counter value provided in the retransmission return message (five least significant bits of the absolute data transfer unit counter value) have a maximum value and therefore the five significant bits of the counter are just before a wrap-around;
ConsecutiveGoodDTUs [4:0]=11111 which indicates that the maximum number for the historic information of consecutive correct received data transfer units has been "virtual" received in the past.

The retransmission return message is in embodiments provided as codeword (RRC codeword). The redundancy field is generated based on the provided predetermined information.

The above described retransmission return message is provided as long as no data transfer unit is received by device 104 from device 102.

In case less than two, i.e. only one data transfer unit is received by the device 104, a second mode of generating the retransmission return message is provided. Here, at least one of the information, i.e. the acknowledgement of the last received data transfer unit is provided based on the factual receiving of data transfer unit by device 104. Furthermore, the counter value provided in the retransmission return message is set to the minimum which indicates that the wrap-around in the absolute counter value has occurred with the beginning of showtime for communication channel 106. The information provided in this case therefore are:
Nack[1:0]=0x where x is according to the last factual received data transfer unit;
AbsoluteDTUCountLsbs[4:0]=00000;
ConsecutiveGoodDTUs [4:0]=11111.

In case that more than one but less than a predetermined number of data transfer units have been received by device 104, the generating of the retransmission return message is provided based on the factual received data transfer unit and the assumption of virtual received data transfer units prior to the first factual receiving of a data transfer unit by device 104.

In this mode, the retransmission return message is obtained by:
Nack[1:0]=yx where x is according to the last factual received data transfer unit and y is according to the second-to-last factual received data transfer unit.
ConsecutiveGood DTUs[4:0]:
  If Nack[1]=0, i.e. the second to the last factual received data transfer unit is correct, then ConsecutiveGoodD-TUs[4:0]=number of consecutive correct data transfer units preceding the data transfer unit with count number AbsoluteDTUCount−1, wherein the counting includes factual received as well as "virtual" received data transfer units;
  If Nack[1]=1, i.e. the second to the last factual received data transfer unit is corrupt, then ConsecutiveGoodD-TUs[4:0]=number of consecutive correct data transfer units from and including the data transfer unit with count number AbsoluteDTUCount−1−Ib, wherein the counting includes factual received as well as "virtual" received data transfer units.
AbsoluteDTUCountLsbs[4:0]=z where z is the actual absolute count number counted from the first received data transfer unit.

The above mode which mixes factual and "virtual" received data transfer units for generating the retransmission return message is provided for a predetermined number of retransmission return messages until no virtual data transfer units are any longer used for providing the historic information ConsecutiveGoodDTUs [4:0].

In the above embodiment, the device 104 may determine based on the number of factual received data transfer units in which mode the retransmission return message is to be provided.

It is to be noted that with the above concept of using virtual received data transfer units, an unrequested retransmission is avoided in the case that the retransmission channel 106 has not or only recently entered showtime while channel 108 transmitting the retransmission return messages from device 104 to device 102 is already in showtime.

A further embodiment for providing retransmission return messages from device 104 to the device 102 when communication channel 106 enters into showtime is described in the following.

This further embodiment is based on the generation of redundancy information for the retransmission return message. In case the communication channel 106 has not entered showtime while the communication channel 108 is already in showtime, the device 104 will in this embodiment intentionally manipulate and destroy the redundancy information. Device 102 receiving the retransmission return message will therefore interpret the received retransmission return message as not a valid information. Device 104 will therefore not exert unrequested retransmissions when communication channel 106 enters showtime.

In another embodiment, the device 104 may generate and transmit the retransmission return messages with correct redundancy information but device 102 receiving the return messages may intentionally ignore or discard the retransmission return messages received from device 104. This discarding of received retransmission return messages may be provided for a configurable predetermined time which includes the time in which the communication channel 106 is not in showtime as well as the time afterwards until the history information of the retransmission return messages can be generated by device 104 fully based on factual received data transfer units.

For the generating of the retransmission return message two different modes may be used in order to avoid loss of information due to the insertion of the synchronization DMT symbol as described above.

In such embodiments, a first mode is a strict direct mode in which the device 104 inserts the absolute sequence identifier of the most recent received data transfer unit into the retransmission return message when generating this message. Such a mode alone however causes problems in view of the transmitting of synchronization symbols as will be explained with respect to FIG. 6a.

Figure 6A:
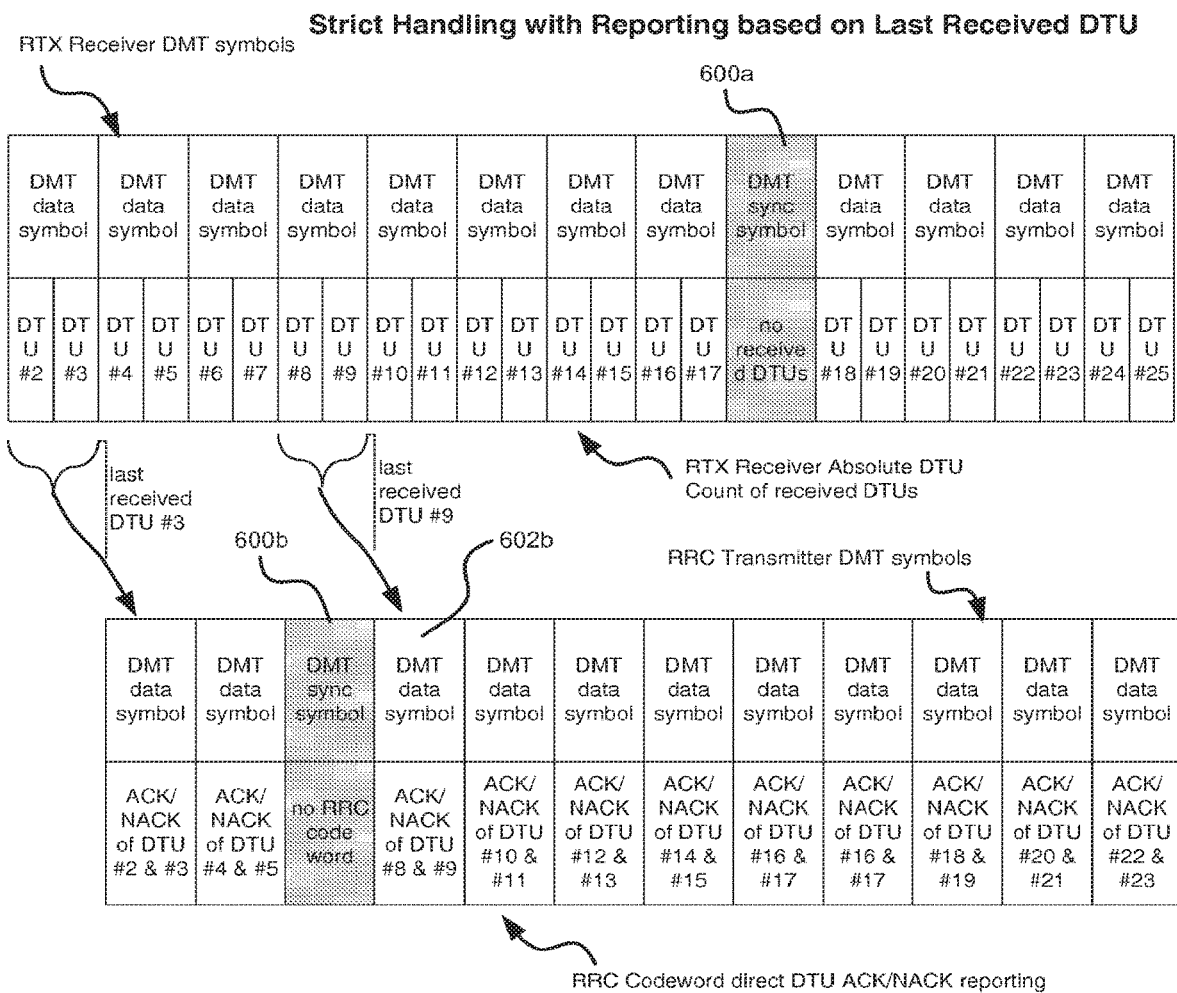

FIG. 6a shows an embodiment in which a data transfer unit is determined to have a size of 0.5 transmission symbols, i.e. DMT symbols. The size of data transfer unit may be configurable in a certain range for example to include from 0.5 up to 4 DMT symbols. For the setting of 0.5, not more than 2 data transfer units per transmission symbol can be provided when transmitting the data transfer unit over the communication channel 106. Furthermore, with the retransmission return message having two acknowledgements fields per RRC code word, which is transmitted every DMT symbol over the communication channel 108, it could be assumed that a direct acknowledgement for each received data transfer unit is obtained. However, this is not the case due to the transmitting of the DMT sync symbols (for example every $69^{th}$ symbol) as will be explained with respect to FIG. 6a.

FIG. 6a shows a sequence of DMT symbols labeled "RTX Receiver DMT symbols" which is received by device 104 (RTX receiver) from device 102 (RTX transmitter). The corresponding sequence with the absolute DTU count numbers of the data transfer units provided in the DMT symbols is shown with label "RTX Receiver Absolute DTU Count of received DTUs".

FIG. 6a further shows the sequence of DMT symbols transmitted in the other direction from the device 104 to the device 102. This sequence is labeled "RRC Transmitter DMT symbols" in FIG. 6a. The sequence of the corresponding acknowledgement bits ACK/NACK of the RRC codeword provided in a respective DMT symbol is shown with label "RRC Codeword direct DTU ACK/NACK reporting".

Having now the scheme of the first mode in which the absolute count number of the last received and the absolute count number of the second to last received data transfer unit is acknowledged, it can be seen in FIG. 6a that a correct direct acknowledgement is provided for received DTU #2 and DTU #3 and received DTU #4 and DTU #5. However with the inserting of a DMT sync symbol 600b in the sequence transmitted from device 104 to 102, no codeword can be transmitted during this time slot. Therefore, for the next available DMT data symbol for transmitting the retransmission return message, which is marked in FIG. 6a with 602b, the last received data transfer unit is the DTU #9 and the second last received data transfer unit is the DTU #8. Strictly applying now the scheme of the first mode, an acknowledgement would result in a gap such that no acknowledgement for the received data transfer units DTU #6 and #7 is transmitted from device 104 to device 102. On the other hand, when a DMT sync symbol 600a is transmitted over channel 106, the data transfer units received in the DMT symbol just before the DMT sync symbol would be transmitted twice as shown in FIG. 6a.

These problems are avoided by generating the acknowledgement flag of the retransmission return message in two modes. In the first mode, as described above, the last and the second to last data transfer unit at the moment of generating the retransmission return message is acknowledged. In the second mode, the generating of the retransmission message is based on including the absolute count number of the data transfer units which are included in the second to last DMT symbol and not the absolute count number of the data transfer units which are included in the last DMT symbol.

For the embodiment of having as minimum 2 data transfer units in one DMT symbol, this can be expressed by the rule:

if AbsoluteDTUCount(x)−AbsoluteDTUCountReport
   (x−1)>2 then

AbsoluteDTUCountReport(x)=AbsoluteDTUCoun-
   tReport(x−1)+2 else

AbsoluteDTUCountReport(x)=AbsoluteDTUCount(x)

end.

In the above rule,
AbsoluteDTUCount(x) is the current last received DTU value for RRC codeword of symbol x in direction from device 104 to device 102,
AbsoluteDTUCountReport(x−1) is the Absolute DTU Count value for reporting in the last RRC codeword, and
AbsoluteDTUCountReport(x) is the Absolute DTU Count value for reporting in the current RRC codeword.

Furthermore, AbsoluteDTUCountLsbs[4:0] is provided to be the 5 last significant bits of the AbsoluteDTUCountReport as determined by the above rule.

With this scheme using two different modes for providing the acknowledgement information, the device 104 executes the DTU based reporting in such a way that no direct gaps in the acknowledgement information (NACK/ACK) appear.

The device 104 executes the strict last received DTU based reporting only if no direct ACK/NACK reporting gaps happen. If these gaps would happen according to the strict last received reporting, the current reporting is switched to a second mode in which the reporting is based on the second data transfer unit after the last received data transfer unit of the previous RRC codeword.

FIG. 6b shows the sequences of FIG. 6b with the two-mode-reporting. It can be seen that no gap appears in the RRC codeword sequence which is transmitted from device 104 to device 102.

Based on the receiving of a retransmission return message, the device 102 may provide a retransmission of one or more data transfer units stored in the retransmission buffer.

In the case that the device 102 receives no acknowledgement or a negative acknowledgement of the transmitted data transfer unit for example due to a long SHINE impulse disturbing the retransmission return channel, the following scheme is applied. The data transfer unit in the retransmission queue is retransmitted exactly after a predetermined number (Qtx−1) of other data transfer units that have been transmitted by the device 102 since the last transmission of this data transfer unit if no acknowledgement has been received for the data transfer unit until then. In other words, any unacknowledged data transfer unit at the end of the retransmission queue is retransmitted exactly every Qtx data transfer units. An upper time limit herein after referred to as delay_max is defined for the above described retransmitting of unacknowledged data transfer units. Delay_max defines for each data transfer unit a predetermined time limit or threshold. Once this time limit has exceeded by the data transfer unit, the data transfer unit is no longer eligible for retransmission and will not be transmitted.

In addition to the above described cyclic repetition every Qtx data transfer units, the retransmission scheme includes a final-transmission scheme which may also be referred to as last-chance-retransmission. Whenever a data transfer unit that is anywhere in the retransmission queue exceeds a predetermined final-transmission time limit or threshold which is provided to be before the end of delay_max, the data transfer unit will be transmitted. In other words, the providing of the final transmission is independent of the position of this data transfer unit in the queue and is based only on the final-transmission time limit. In one embodiment, the final-transmission time limit is configured to be within the last transmission which is possible before delay_max is exceeded. Thus, in this embodiment, if it is determined that any data transfer unit would exceed the delay_max constraint if it would be retransmitted later than the next outgoing data transfer container, this data transfer unit is retransmitted with the next possible outgoing data transfer container. In another embodiment, the final transmission time limit may be configured to be one or more data transfer units ahead of the last possible transmission which may add more safety that the data transfer unit has not exceeded the delay_max when it is scheduled for transmission.

Figure 7:
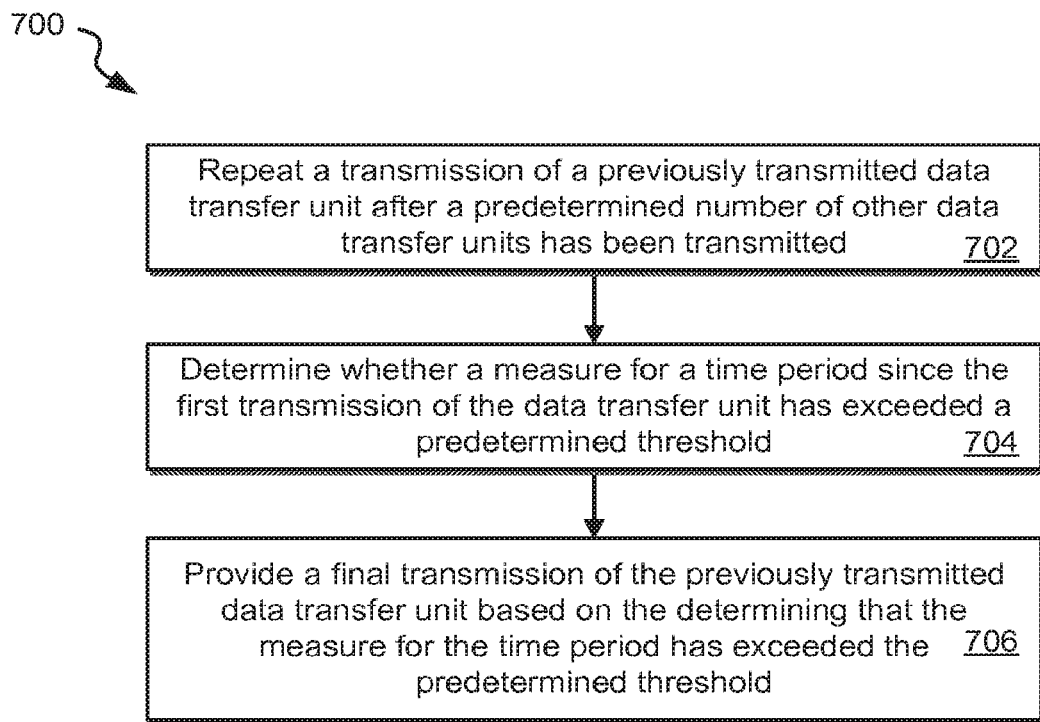
FIG. 7 shows an exemplary flow diagram.

FIG. 7 shows a flow chart 700 according to an embodiment of the combined cyclic retransmission and final transmission.

In 702, a transmission of a previously transmitted data transfer unit is repeated after a predetermined number of other data transfer units has been transmitted. In 704, it is determined whether a measure for a time period since the first transmission of the data transfer unit has exceeded a predetermined threshold. In other words, it is determined in 704 whether a measure for the time which has passed since the very first transmission of the previously transmitted data transfer unit and the actual time when making the decision exceeds a limit or threshold. The determining may for example be implemented by using a time stamp of the previously transmitted for comparing with a threshold. In another embodiment, it may be determined whether a predefined number of data transfer units have been transmitted since the very first transmission of this previously transmitted data transfer unit. However, in other embodiments other ways of making the determining whether the time period between the very first transmitting and the actual time when making the determination exceeds the limit or threshold may be provided. In 706, a final transmission of the previously transmitted data transfer unit is provided based on the determining that the measure for the time period has exceeded the predetermined threshold.

In embodiments, after the final-transmission is provided for a data transfer unit, a marking is provided which induces that this data unit is no longer eligible for retransmission. In one embodiments, the data transfer unit is marked as acknowledged which induces that no further transmission will be provided by device 102. No other changes are done in the buffer, and the transmitted data transfer unit will not be fed into the beginning of the queue.

It is to be noted that this final transmission will be provided for a data transfer unit even if the time period before the previous transmission of this data transfer unit is so short that an acknowledgement could not be received in view of the round-trip time of the communication system. The round-trip time is a measure for the time it takes to process and transmit the data transfer unit at the device 102, to receive and process the data transfer unit at the device 14, to process and transfer the retransmission return message at the device 104 and to receive and process the retransmission return message at the device 102.

Since the final transmission can be regarded as some kind of preemption, the transmission of a data transfer unit which is scheduled for transmission according to the above described cyclic scheme has to be delayed by one data transmission unit container.

The final transmission scheme provides a better performance in cases when long noise impulses such as long SHINE impulses occur. This can be seen with respect to FIGS. 8a to 8d.

Figure 8A:
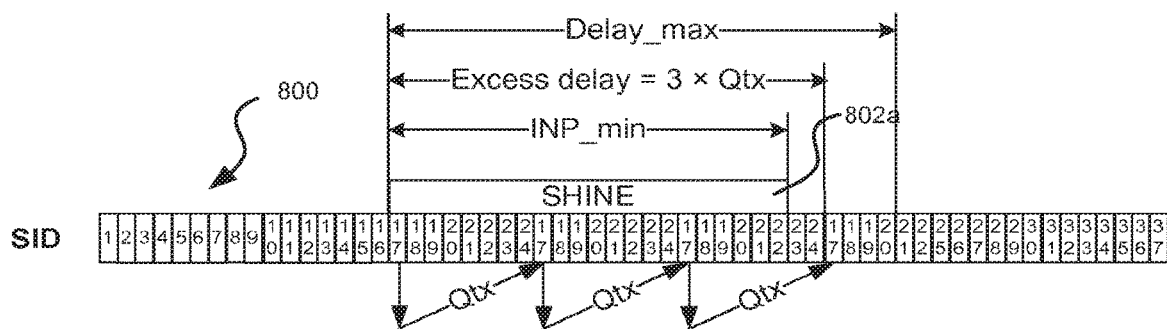
FIG. 8*a-d* show exemplary data transfer sequences.

FIG. 8a shows a data transfer unit 800 which is obscured by a SHINE impulse 802a. The SHINE impulse 802a does not allow receiving acknowledgements for the transmitted data transfer units. The shine impulse 802a is in FIG. 8a short enough such that the cyclic scheme of transmitting every Qtx data transfer units alone succeeds in retransmitting all data transfer units after the SHINE impulse 802a has ended before delay_max has ended. Here the cyclic scheme alone is capable of successfully providing retransmission for all data transfer units without the need for a final transmission.

It becomes clear that the cyclic scheme alone is successful when:

$$\mathrm{ceil}(IL\_SHINE/Qtx)*Qtx<\mathrm{delay\_max}*fs/(S1*Q),$$

wherein IL_SHINE is the amount of corrupted data transfer units as seen at the delta interface of the physical layer and Qtx is the predetermined number of data transfer units, delay_max is the maximum allowed retransmission period in msec, fs is the symbol rate in kilo symbols/sec and S1Q is the size of a data transfer units in symbols.

If the above condition is not met, the cyclic scheme alone may not allow the retransmission of all data transfer units before the end of delay_max.

Figure 8B:
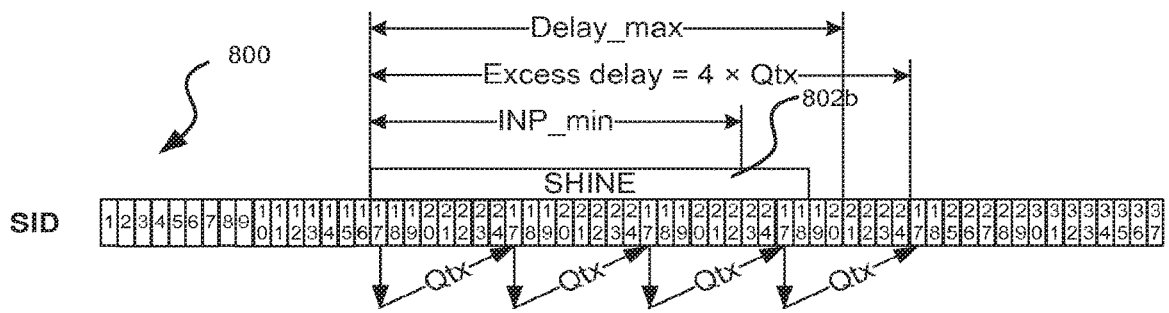

Such a situation is shown in FIG. 8b. FIG. 8b shows a situation for a longer SHINE impulse 802b when only the cyclic scheme would be applied. It can be seen that the data transfer unit with sequence identifier number (SID) 17 which is the first data transfer unit obscured by the SHINE impulse 802*b* would not be transmitted successful because, after the ending of SHINE impulse 802*b*, the data transfer unit with SID 17 is scheduled by the cyclic scheme to be transmitted after delay_max. It is to be noted that not only the data transfer unit with SID 17 but also the data transfer unit with SID 18 would not be transmitted by the cyclic scheme alone.

Figure 8C:
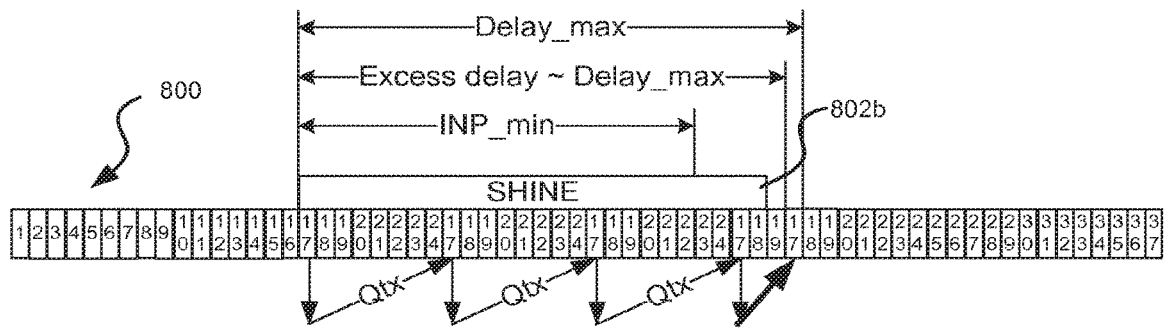

FIG. 8*c* shows the same situation for the cyclic scheme including the final transmission scheme. In FIG. 8*c*, the data transfer unit with SID 17 is included in the last possible container before delay_max ends for this data transfer unit. Thus, with the final transmission scheme, instead of transmitting in this container the data transfer unit with SID 20 (see FIG. 8*b*), the final transmission data transfer unit with SID 17 is transmitted due to the final transmission of this data transfer unit. Furthermore, for the next container, instead of transmitting in this container the data transfer unit with SID 21 (see FIG. 8*b*), the data transfer unit with SID 18 is transmitted due to the final transmission of this data transfer unit. For the following container, instead of transmitting in this container the data transfer unit with SID 22 (see FIG. 8*b*), the data transfer unit with SID 19 is transmitted due to the final transmission of this data transfer unit. It is to be noted that although the data transfer unit with SID 19 has been transmitted right after the ending of the SHINE impulse and therefore is likely to be received correct, the final transmission for this data transfer unit is provided because no acknowledgement has been received due to the round-trip time until the point in time when it is decided to provide a final transmission for this data transfer unit.

Figure 8D:
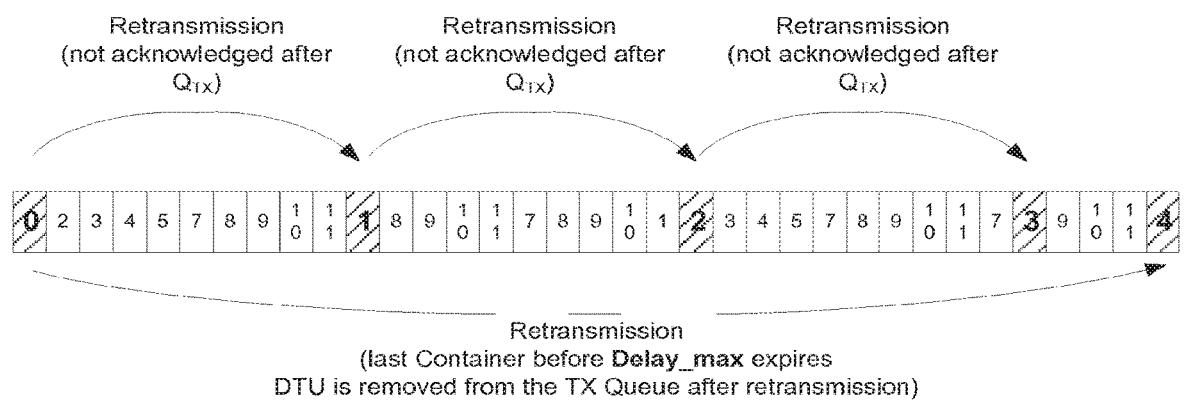

FIG. 8*d* shows for the data transfer unit with SID 17 the retransmission provided. It can be seen that until the final transmission is provided, three retransmissions have been performed in the cyclic scheme, the distance between all being constant. The final transmission is then performed in a non-regular manner three data transfer units after the last transmission of this data transfer unit.

It becomes clear that with the including of a final-transmission scheme in the cyclic scheme, an improved protection performance is achieved for the communication system. For the minimum Impulse Noise protection provided by the above described scheme including a final transmission, the following constraint can be established:

$$INP\_min \leq \text{floor}(\text{floor delay\_max}*fs)(S*Q))*(S*Q).$$

Figure 9:
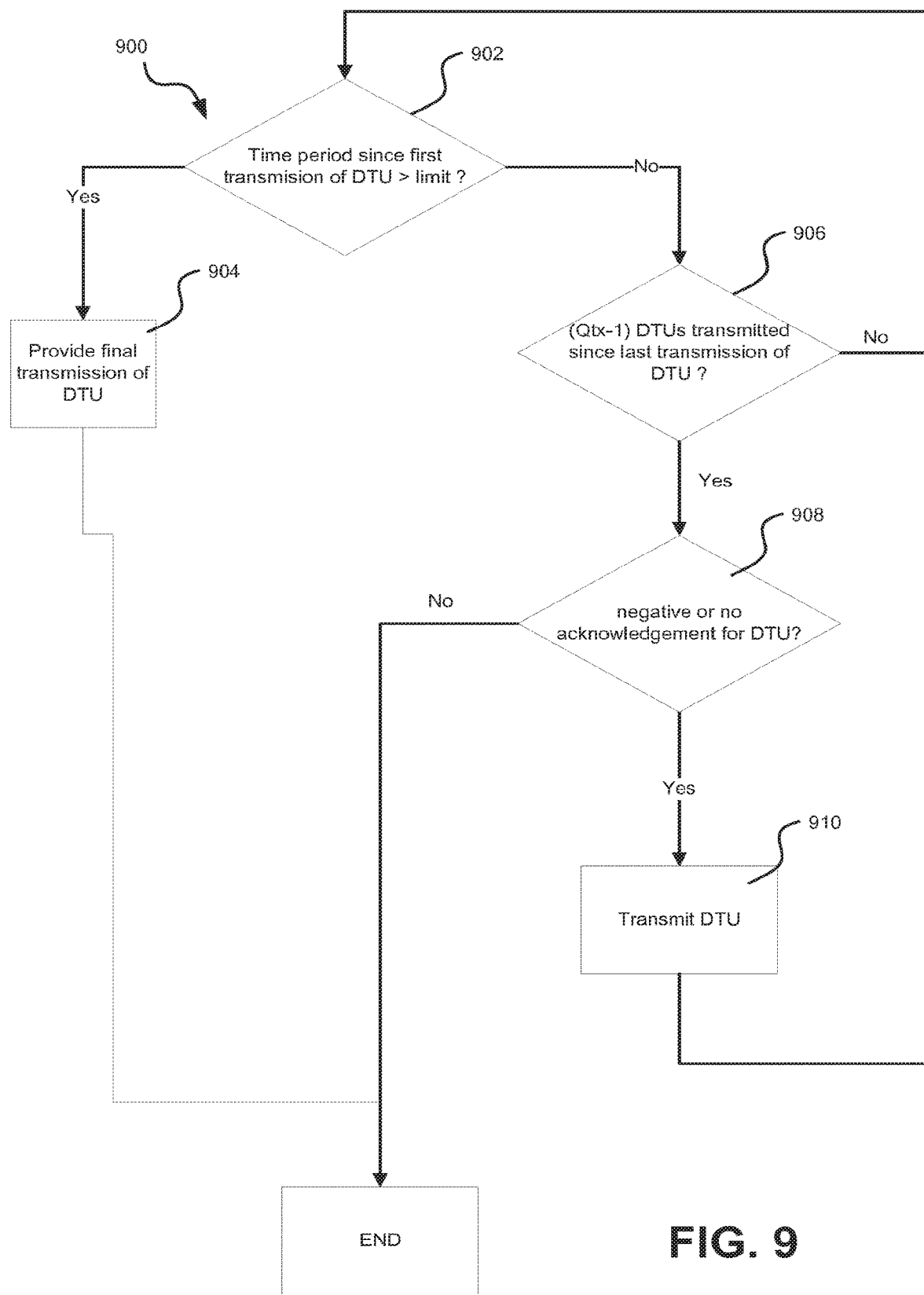
FIG. 9 shows an exemplary process flow diagram.

FIG. 9 shows an exemplary flow diagram 900 according to an embodiment of the present invention.

The flow diagram determines at 902 whether a time period since the first transmission of a data transfer unit has exceeded a predetermined time limit. If it is determined at 902 that the predetermined time limit has been exceeded, then the final transmission is provided at 904 and the process ends. If it is determined at 902 that the time period has not exceeded, then process proceeds to 906 where it is determined whether (Qtx−1) data transfer units have been transmitted since the last transmission of this data transfer unit. If it is determined at 906 that (Qtx−1) data transfer units have not been transmitted, the process returns to 902. If it is determined at 906 that (Qtx−1) data transfer units have been transmitted, then the process proceeds to 908 where it is determined whether a negative or no acknowledgement has been received. If it is decided that a negative or no acknowledgement has not been received, i.e. a positive acknowledgement has been received, the process ends. If it is determined at 908 that no acknowledgment or a negative has been received, the data transfer unit is transmitted at 910 and the process returns to 902.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" or "unit" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of the described entity. For example, specific embodiments described herein described herein to be implemented in a transmitter, receiver or transceiver may be implemented in sub-entities such as a chip or a circuit provided in such an entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended.

It is further to be noted that methods disclosed in the specification or in the claims may be implemented by a device having means for performing each of the respective steps of these methods.

What is claimed is:

1. A digital subscriber line (DSL) noise protection apparatus, the apparatus comprising:
    first circuitry configured to receive data transfer units including at least one data transfer unit corrupted by noise;
    second circuitry configured to generate a retransmission return message with a number of the data transfer units acknowledged;
    wherein the second circuitry is configured to determine a start of the data transfer units acknowledged based on a look back value; and
    wherein the second circuitry is configured to use a value of a delay between transmissions of a data transfer unit as the look back value.

2. The apparatus of claim 1, wherein the second circuitry is configured to use a value of the delay between consecutive transmissions of the data transfer unit as the look back value.

3. The apparatus of claim 1, wherein the second circuitry is configured to use Qtx a value of the delay between transmissions of the data transfer unit as the look back value.

4. The apparatus of claim 1, wherein the look back value is based on a length of a retransmission queue.

5. The apparatus of claim 1, wherein the second circuitry is configured to obtain the number from a non-acknowledgment signal field in the retransmission return message.

6. The apparatus of claim 1, wherein the second circuitry includes a framer.

7. The apparatus of claim 1, wherein the second circuitry includes a retransmission queue.

8. The apparatus of claim 1, wherein the second circuitry includes a multiplexer.

9. The apparatus of claim 1, wherein the second circuitry is further configured to determine when one of the data transfer units is to pass a predefined point in a transmission protocol based on a timestamp.

10. The apparatus of claim 1, wherein the first circuitry is configured to receive the at least one data transfer units corrupted by impulse noise.

11. A digital subscriber line (DSL) noise protection apparatus, the apparatus comprising:
    first circuitry configured to transmit data transfer units;
    second circuitry configured to generate a retransmission return message with a number of acknowledged data transfer units;
    wherein the second circuitry is configured to determine a start of the acknowledged data transfer units based on a look back value; and
    wherein the second circuitry is configured to use a value of a delay between transmissions of a data transfer unit as the look back value.

12. The apparatus of claim 11, wherein the second circuitry is configured to use a value of the delay between consecutive transmissions of the data transfer unit as the look back value.

13. The apparatus of claim 11, wherein the second circuitry is configured to use Qtx a value of the delay between transmissions of the data transfer unit as the look back value.

14. The apparatus of claim 11, wherein the look back value is based on a length of a retransmission queue.

15. The apparatus of claim 11, wherein the second circuitry is configured to obtain the number from a non-acknowledgment signal field in the retransmission return message.

16. The apparatus of claim 11, wherein the first circuitry includes a framer.

17. The apparatus of claim 11, wherein the second circuitry includes a retransmission queue.

18. The apparatus of claim 11, wherein the second circuitry includes a multiplexer.

19. The apparatus of claim 11, wherein the first circuitry is further configured to determine when one of the data transfer units is to pass a predefined point in a transmission protocol based on a timestamp.

20. The apparatus of claim 11, wherein the second circuitry is configured to generate the retransmission return message with the number of acknowledged data transfer units not corrupted by impulse noise.

21. A digital subscriber line (DSL) noise protection apparatus, the apparatus comprising:
    retransmission circuitry configured to generate a retransmission return message with a number of the data transfer units acknowledged that are not corrupted by noise;
    logic circuitry is configured to determine a start of the data transfer units acknowledged based on a look back value; and
    wherein the logic circuitry is configured to use a value of a delay between transmissions of a data transfer unit as the look back value.

22. A digital subscriber line (DSL) noise protection system, the system comprising:
    a first communication device configured to prepare data transfer units to be transmitted;
    a second communication device configured to receive the data transfer units transmitted including at least one data transfer unit corrupted by noise;
    wherein the second communication device is configured to generate a retransmission return message with a number of the data transfer units acknowledged;
    wherein the second communication device is configured to determine a start of the data transfer units acknowledged based on a look back value; and
    wherein the second communication device is configured to use a value of a delay between transmissions of a data transfer unit as the look back value.

23. A digital subscriber line (DSL) noise protection method, the method comprising:
    receiving data transfer units including at least one data transfer unit corrupted by noise;
    generating a retransmission return message with a number of the data transfer units acknowledged;
    determining a start of the data transfer units acknowledged based on a look back value that is a delay between transmissions of a data transfer unit.

24. The method of claim 23, further comprising determining when one of the data transfer units is to pass a predefined point in a transmission protocol based on a timestamp.

25. The method of claim 23, further comprising receiving the at least one data transfer units corrupted by impulse noise.

* * * * *